US007896207B1

(12) United States Patent
Latham

(10) Patent No.: US 7,896,207 B1
(45) Date of Patent: Mar. 1, 2011

(54) WEDGE-SHAPED STORAGE BAG FOR ATTACHMENT TO A BICYCLE FRAME AND CAR CARRIER

(76) Inventor: Michael Latham, Aurora, CO (US)

( * ) Notice: Subject to any disclaimer, the term of this patent is extended or adjusted under 35 U.S.C. 154(b) by 1016 days.

(21) Appl. No.: 11/725,026

(22) Filed: Mar. 16, 2007

Related U.S. Application Data

(60) Provisional application No. 60/783,484, filed on Mar. 20, 2006.

(51) Int. Cl.
*A45C 13/38* (2006.01)
*A45F 4/02* (2006.01)
*B60R 99/00* (2009.01)

(52) U.S. Cl. ................... 224/585; 224/416; 224/417; 224/426; 224/463; 224/572

(58) Field of Classification Search ............... 224/319, 224/416, 417, 425, 426, 439, 463, 572, 585, 224/622
See application file for complete search history.

(56) References Cited

U.S. PATENT DOCUMENTS

| | | | | |
|---|---|---|---|---|
| 522,186 | A | * | 7/1894 | Andrews ............... 224/439 |
| 575,536 | A | * | 1/1897 | Swanson ............... 224/426 |
| 2,196,341 | A | * | 4/1940 | Rush .................... 224/318 |
| 4,059,207 | A | * | 11/1977 | Jackson et al. .......... 224/413 |
| 4,368,897 | A | * | 1/1983 | Brown ................... 280/202 |
| 5,031,807 | A | * | 7/1991 | Tiffany .................. 224/429 |
| 5,244,132 | A | * | 9/1993 | Christen ................ 224/430 |
| 5,249,721 | A | * | 10/1993 | Brooks .................. 224/426 |
| 5,799,851 | A | * | 9/1998 | Wulf et al. .............. 224/583 |
| 5,881,708 | A | * | 3/1999 | Kliot .................... 224/653 |
| 6,024,265 | A | * | 2/2000 | Clements ............... 224/630 |
| 6,070,776 | A | * | 6/2000 | Furnary et al. .......... 224/627 |
| 6,422,439 | B1 | * | 7/2002 | Kelliher et al. .......... 224/148.2 |
| 6,729,519 | B2 | * | 5/2004 | Kestler ................. 224/584 |
| 2005/0092803 | A1 | * | 5/2005 | Collier et al. ........... 224/631 |
| 2006/0011689 | A1 | * | 1/2006 | Reid .................... 224/637 |
| 2007/0272719 | A1 | * | 11/2007 | Laughton ............... 224/629 |

* cited by examiner

*Primary Examiner*—Justin M Larson
*Assistant Examiner*—Adam Waggenspack
(74) *Attorney, Agent, or Firm*—Edwin H. Crabtree; Ramon L. Pizarro

(57) ABSTRACT

A wedge-shaped storage bag designed and dimensioned for receipt in a triangular-shaped space between a bicycle frame's front fork tube and an angled down tube and on top of a car top carrier, when the car top carrier is carrying one or more bicycles thereon. The storage bag includes a horizontal bottom, a front portion having a height greater than a rear portion and a top portion. The top portion is angled upwardly from a top of the rear portion to a top of the front portion. The top portion and front portion have a wedge-shaped or an inverted "V" shaped configuration. Also, the storage bag includes a first side and a second side with access openings therein for entrance inside the bag and storing items therein. Further, the storage bag includes a down tube attachment strap mounted on the top portion, an upper, fork tube attachment strap and a lower, first car top carrier attachment strap mounted on the front portion, and a lower, second car top carrier attachment strap mounted on the rear portion of the storage bag. The attachment straps are used for releasable attachment of the storage bag to the bicycle frame and the car top carrier.

11 Claims, 2 Drawing Sheets

WEDGE-SHAPED STORAGE BAG FOR ATTACHMENT TO A BICYCLE FRAME AND CAR CARRIER

This application is based on an earlier filed provisional patent application Ser. No. 60/783,484, filed on Mar. 20, 2006, by the subject inventor and having a title of "GEAR TOTE ADAPTED FOR USE WITH A VEHICLE-MOUNTED BICYCLE CARRIER".

BACKGROUND OF THE INVENTION (a) Field of the Invention

This invention relates to a storage bag or gear tote for storing various items therein and more particularly, but not by way of limitation, to a wedge-shaped storage bag designed and dimensioned for receipt between a bicycle frame's front fork tube and an angled down tube and on top of a car top carrier, when the car top carrier is carrying one or more bicycles thereon (b) Discussion of Prior Art Heretofore, there have been various types and sizes of storage bags and gear totes for carrying outdoor equipment, sporting goods, clothes and other types of equipment. None of these prior art storage bags or gear totes are specifically designed for releasable attachment to an inside of a front of a bicycle frame, when a bicycle is carried on top of a car top carrier.

SUMMARY OF THE INVENTION

In view of the foregoing, it is a primary objective of the subject invention to provide a storage bag or gear tote used for releasable attachment inside a triangular-shaped space in a front of a bicycle frame carried on a car top carrier. The storage bag provides cargo storage outside a vehicle's interior.

Another object of the invention is one or more of the storage bags can be used with any number of bicycle frames mounted on top the car top carrier. This feature helps reduce crowed storage space inside the vehicle carrying the bicycles.

Still another object of the storage bag is it can be quickly attached to the bicycle frame when the frame is mounted on top of the car top carrier. Also, it can be just as quickly detached from the frame when unloading the bicycle.

Yet another object of the invention is the storage bag is streamlined and compact in design to prevent air drag when transported on top of the vehicle. Also, the storage bag, by it's wedge-shaped design, is ready adaptable to different types and styles of bicycles and stored in a triangular-shaped space between the front fork tube and angled down tube of the bicycle frame.

The subject invention includes a wedge-shaped storage bag or gear tote dimensioned for receipt inside a triangular-shaped space of a bicycle frame between a front fork tube and an angled down tube of the frame. The storage bag is adapted for releasable attachment to the front fork tube, the angled down tube and to a top of a car top carrier attached to the top of a vehicle. The car top carrier includes a wheel tray adapted for holding a bicycle on top thereof.

The storage bag includes a horizontal bottom, a front portion having a height greater than a rear portion and a top portion. The top portion is angled upwardly from a top of the rear portion to a top of the front portion. The top portion and the front portion, when viewing the bag from the side, forms a wedge-shaped or an inverted "V" shaped configuration. Also, the storage bag includes a first side and a second side with access openings therein for entrance inside the bag and storing items therein. Further, the storage bag includes a down tube attachment strap mounted on the top portion, an upper, fork tube attachment strap and a lower, first car top carrier attachment strap mounted on the front portion, and a lower, second car top carrier attachment strap mounted on the rear portion of the storage bag. The attachment straps are used for releasable attachment of the storage bag to the bicycle frame and the car top carrier.

These and other objects of the present invention will become apparent to those familiar with various types and designs of storage bags and gear totes when reviewing the following detailed description, showing novel construction, combination, and elements as herein described, and more particularly defined by the claims, it being understood that changes in the embodiments of the invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for the practical application of the invention and in which.

DETAILED DESCRIPTION OF THE PREFERRED EMBODIMENTS

Figure 1:
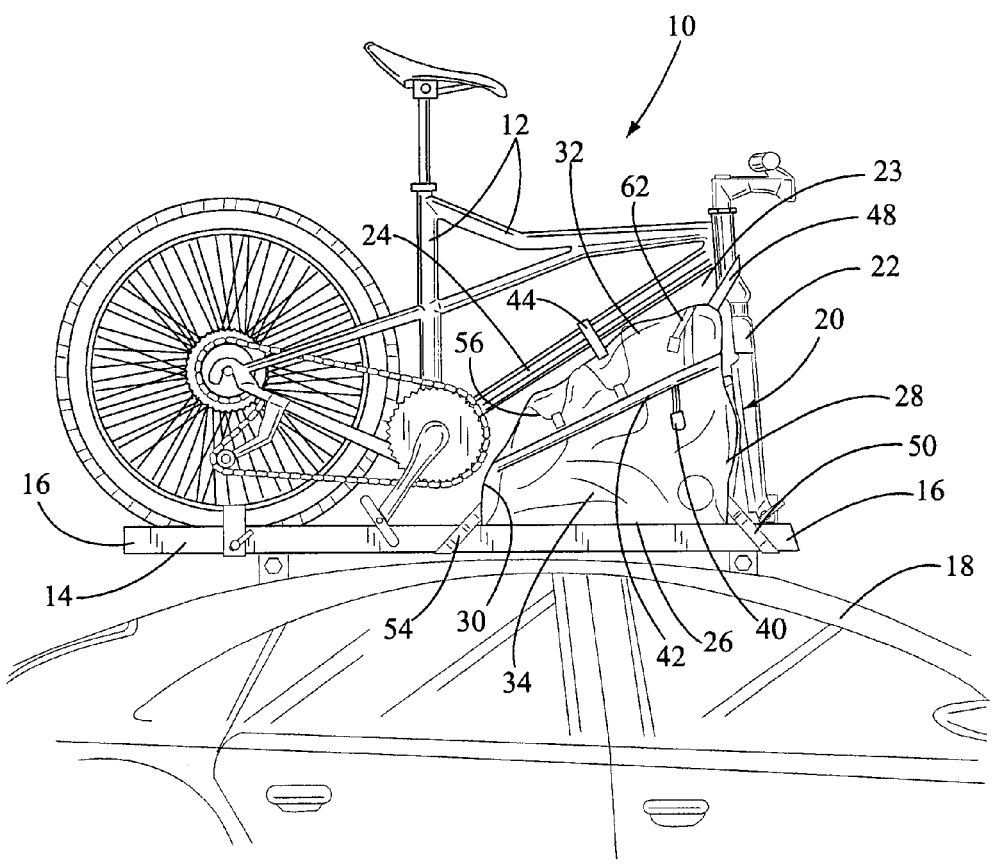
FIG. 1 is a side view of a bicycle with bicycle frame mounted on top of a car top carrier. The car top carrier is shown attached to a top of a vehicle. The subject wedge-shaped, storage bag is shown releasably attached to an inside of a front of the bicycle frame.

In FIG. 1, a side view of a bicycle, having a general reference numeral 10, with a bicycle frame 12 shown mounted on top of a car top carrier 14 with one or more wheel trays 16 for holding one or more bicycles on the carrier. Only one bicycle 10 is shown in the drawings. The car top carrier 14 is shown attached to a top of a vehicle 18. The subject wedge-shaped, storage bag is shown having general reference numeral 20. The storage bag 20 in this drawing is releasably attached to a front fork tube 22 and an angled down tube 24, which are part of the front of the bicycle frame 12 and forming a triangular-shaped space 23 therebetween. The front fork tube 22 extends downwardly from the frame 12 and is approximately vertical. The angled down tube 24 extends downwardly at approximately 45 degrees from the vertical.

The storage bag 20 is releasably attached to the top of the car top carrier. It should be mentioned that any number of different types of bicycles allow for quick removal of a bicycle's front tire for ease in transporting the bicycle as shown in FIG. 1. Obviously, this feature allows for the use of the storage bag 20 inside the front of the frame 12 as shown in this drawing.

Figure 2:
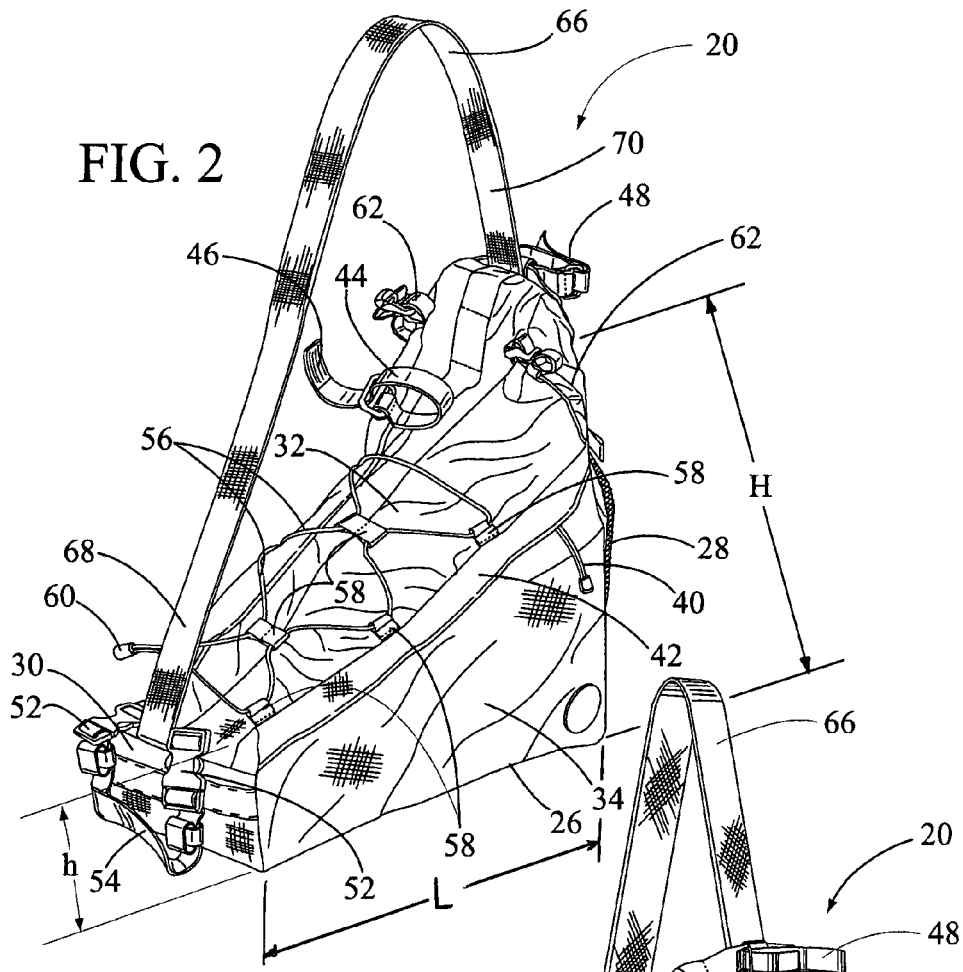
FIG. 2 is a side perspective view of the detailed structure of the storage bag looking from a rear portion of the bag to a front portion of the bag.

In FIG. 2, a side perspective view of the detailed structure of the storage bag 20 is shown looking from a rear to a front of the bag. The storage bag 20 includes a horizontal bottom 26, a front portion 28, having a height "H", a rear portion 30, having a height "h" and a top portion 32. The height "H" is approximately 18 inches or in a range of 16 to 20 inches. The height "h" is approximately 5 inches or in a range of 4 to 6 inches. The bag also has a length "L" approximately 17 inches or in a range of 16 to 18 inches.

The top portion 32 is angled, as shown in the drawings, upwardly from a top of the rear portion 30 to a top of the front portion 28. From viewing the bag from the side, the top portion and front portion form a wedge-shape or an inverted "V", wedge-shaped configuration for receipt in the triangular-shaped space 23, as seen in FIG. 1.

Figure 3:
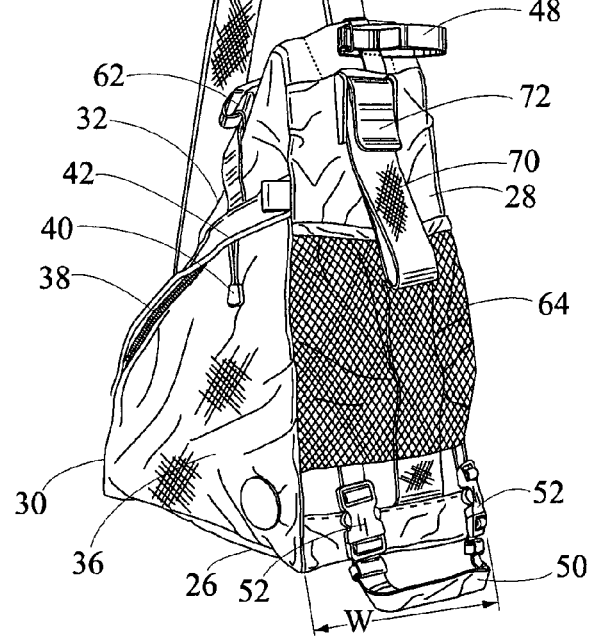
FIG. 3 is another side perspective view of the detailed structure of the storage bag looking from the front portion of the bag to the rear portion of the bag.

Also, the storage bag 20 includes a first side 34 and an opposite, second side 36 with access openings opened with zippers 38. The two zippers 38 include a zipper pull 40 and a zipper cover 42. One of the zippers 38 is shown in FIG. 3. The opening of either zipper 38 provides quick access inside the bag for storing various items therein. The bag 20 has a width "W", which is approximately 8 inches or in a range of 6 to 10 inches.

The storage bag 20 also includes a down tube attachment strap 44 with hook and loop fasteners 46 mounted on the top portion 32 for adjustably securing the bag to the angled down tube 24. An upper, fork tube attachment strap 48 with hook and loop fasteners 46 is attached to a top of the front portion 28 for adjustably securing the bag to the front fork tube 22.

Further, the storage bag 20 includes a lower, first car top carrier attachment strap 50 with male and female plastic buckles 52, shown in FIG. 3, mounted on the front portion 28 for securing the bag to front of the car top carrier 14. A lower, second car tip carrier attachment strap 54 with buckles 52 is mounted on the rear portion 30 for securing the bag to a center portion of the car top carrier 14.

Still further, the top portion 32 of the bag 20 includes a bungee cord 56 threaded through cord loops 58 along opposite sides of the top portion. When a bungee cord pull 60 is pulled for tightening the cord, stored items received inside the bag are compressed for a more streamlined bag profile prior to travel. Also, compression straps 62 with hook and loop fasteners 46 are mounted on opposite sides of the top portion 32 for tightening the top of the bag and compressing the stored items therein.

In FIG. 3, another side perspective view of the detailed structure of the storage bag 20 is shown looking from the front portion 28 of the bag to the rear portion 30 of the bag. In this view, a mesh weave, storage pocket 64 is shown attached to the front of the front portion 28 for storing waters bottles or other items therein for quick access. Another added feature of the storage bag 20 is an adjustable carrying strap 66. One end 68 of the carrying strap 66 is attached to the top of the rear portion 30. An opposite end 70 is threaded through a strap buckle 72 attached to the top of the front portion 28. During travel of the storage bag 20 on the bicycle frame 12, the strap 66 is tightened thereon. When the bag is removed from the frame, the strap 66 can be lengthened on the strap buckle 72 and used as a hand or shoulder strap for carrying the storage bag 20. The storage bag can be made of waterproof, wind resistant, heavy nylon flexible material or like material for long life and a streamlined appearance when attached to the bicycle frame.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The embodiments of the invention for which as exclusive privilege and property right is claimed are defined as follows:

1. A wedge-shaped storage bag designed and dimensioned for receipt in a triangular-shaped space, the triangular-shaped space formed when a bicycle's front tire is removed from a bicycle frame's vertical, front fork tube, the triangular-shaped space disposed between the front fork tube, a bicycle frame's, 45 degree from vertical, angled down tube, and a horizontal car top carrier mounted on top of a vehicle when the car top carrier is carrying one or more bicycles thereon, the storage bag for storing various items therein, the storage bag comprising:

a bag member made of water proof, heavy nylon flexible material, the bag member having a horizontal bottom, the horizontal bottom adapted for receipt on top of the horizontal car top carrier;

the bag member having a vertical front portion, the vertical front portion adapted for receipt next to an inside of the front fork tube;

the bag member having a 45 degree from the vertical angled top portion, the angled top portion adapted for receipt next to the angled down tube;

the bag member having a vertical rear portion, the rear portion having a height less than a height of the front portion;

the bag member having a first side with a first access opening therein, the first access opening providing for quick access to the various items stored inside the bag member;

the bag member having a second side with a second access opening therein, the second access opening providing for quick access to the various items stored inside the bag member;

an elastic cord threaded through cord loops, the cord loops attached to opposite sides of the angled top portion of the bag member, whereby when the elastic cord is pulled tight on the cord loops, the items stored inside the bag member are compressed therein for providing a streamlined bag profile and preventing air drag when the bag member is transported on top of the vehicle;

an upper fork tube attachment strap attached to the vertical front portion of the bag member and adapted for releasably engaging an upper portion of the fork tube;

a down tube attachment strap attached to the angled top portion of the bag member and adapted for releasably engaging a portion of the angled down tube;

a car top carrier attachment strap attached to the storage bag and adapted for releasably engaging a portion of the car top carrier; and compression straps mounted on opposite sides of the angled top portion of the bag member, the compression straps for tightening the top portion of the bag member and compressing stored items therein.

2. The storage bag as described in claim 1 further including a pair of car top carrier attachment straps, the pair of car top carrier attachment straps including a first car top carrier attachment strap mounted on the vertical front portion of the bag member and a second car top carrier attachment strap mounted on the vertical rear portion of the top carrier, the first and second car top carrier straps for securing the bag member to the car top carrier.

3. The storage bag as described in claim 1 further including zippers for opening and closing the access openings in the first and second sides of the bag member.

4. The storage bag as described in claim 1 further including a carrying strap, opposite ends of the carrying strap attached to the vertical front portion and the vertical rear portion of the bag member, the carrying strap used for carrying the bag member when not attached to the bicycle frame and car top carrier.

5. The storage bag as described in claim 1 further including a storage pocket attached to the vertical front portion of the bag member, the storage pocket adapted for holding at least one water bottle therein.

6. A wedge-shaped, storage bag designed and dimensioned for receipt in a triangular-shaped space, the triangular-shaped space formed when a bicycle's front tire is removed from a bicycle frame's vertical, front fork tube, the triangular-shaped space disposed between the front fork tube, a bicycle frame's, 45 degree from vertical, angled down tube, and a horizontal car top carrier mounted on top of a vehicle when the car top carrier is carrying one or more bicycles thereon, the storage bag for storing various items therein, the storage bag comprising:

a bag member made of water proof, heavy nylon flexible material, the bag member having a horizontal bottom, the horizontal bottom adapted for receipt on top of the horizontal car top carrier;

the bag member having a vertical front portion, the vertical front portion adapted for receipt next to an inside of the front fork tube;

the bag member having a 45 degree from the vertical angled top portion, the angled top portion adapted for receipt next to the angled down tube;

the bag member having a vertical rear portion, the rear portion having a height less than a height of the front portion;

the bag member having a first side with a first access opening therein, the first access opening providing for quick access to the various items stored inside the bag member;

the bag member having a second side with a second access opening therein, the second access opening providing for quick access to the various items stored inside the bag member;

an elastic cord threaded through cord loops, the cord loops attached to opposite sides of the angled top portion of the bag member, whereby when the elastic cord is pulled tight on the cord loops, the items stored inside the bag member are compressed therein for providing a streamlined bag profile and preventing air drag when the bag member is transported on top of the vehicle;

an upper fork tube attachment strap with hook and loop fasteners attached to the vertical front portion of the bag member adapted for releasably engaging an upper portion of the fork tube;

a down tube attachment strap with hook and loop fasteners attached to the angled top portion of the bag member adapted for releasably engaging a portion of the angled down tube;

a pair of car top carrier attachment straps, the pair of car top carrier attachment straps including a first car top carrier attachment strap with buckles mounted on the vertical front portion of the bag member and a second car top carrier attachment strap with buckles mounted on the vertical rear portion of the top carrier, the first and second car top carrier attachment straps adapted for securing the bag member to the car top carrier; and compression straps with hook and loop fasteners mounted on opposite sides of the angled top portion of the bag member, the compression straps for tightening the top portion of the bag member and compressing stored items therein.

7. The storage bag as described in claim 6 further including zippers with zipper pulls for opening and closing the access openings in the first and second sides of the bag member.

8. The storage bag as described in claim 6 further including an adjustable carrying strap, opposite ends of the carrying strap attached to the vertical front portion and the vertical rear portion of the bag member, the carrying strap used for carrying the bag member when not attached to the bicycle frame and car top carrier.

9. The storage bag as described in claim 6 further including a mesh weave storage pocket attached to the vertical front portion of the bag member, the storage pocket adapted for holding at least one water bottle therein.

10. A wedge shaped storage designed and dimensioned for receipt in a triangular-shaped space, the triangular-shaped space formed when a bicycle's front tire is removed from a bicycle frame's vertical, front fork tube, the triangular-shaped space disposed between the front fork tube, a bicycle frame's, 45 degree from vertical, angled down tube, and a horizontal car top carrier mounted on top of a vehicle when the car top carrier is carrying one or more bicycles thereon, the storage bag for storing various items therein, the storage bag comprising:

a bag member made of water proof, heavy nylon flexible material, the bag member having a horizontal bottom, the horizontal bottom adapted for receipt on top of the horizontal car top carrier;

the bag member having a vertical front portion, the vertical front portion adapted for receipt next to an inside of the front fork tube;

the bag member having a 45 degree from the vertical angled top portion, the angled top portion adapted for receipt next to the angled down tube;

the bag member having a vertical rear portion, the rear portion having a height less than a height of the front portion;

the bag member having a first side with a first access opening therein, the first access opening having a zipper with zipper pull for providing quick access to the various items stored inside the bag member;

the bag member having a second side with a second access opening therein, the second access opening having a zipper with zipper pull for providing quick access to the various items stored inside the bag member;

an elastic cord threaded through cord loops, the cord loops attached to opposite sides of the angled top portion of the bag member, whereby when the elastic cord is pulled tight on the cord loops, the items stored inside the bag member are compressed therein for providing a streamlined bag profile and preventing air drag when the bag member is transported on top of the vehicle;

an upper fork tube attachment strap with hook and loop fasteners attached to the vertical front portion of the bag member and adapted for releasably engaging an upper portion of the fork tube;

a down tube attachment strap with hook and loop fasteners attached to the angled top portion of the bag member and adapted for releasably engaging a portion of the angled down tube;

a pair of car top carrier attachment straps, the pair of car top carrier attachment straps including a first car top carrier attachment strap with buckles mounted on the vertical front portion of the bag member and a second car top carrier attachment strap with buckles mounted on the vertical rear portion of the top carrier, the first and second car top carrier attachment straps and adapted for securing the bag member to the car top carrier;

compression straps with hook and loop fasteners mounted on opposite sides of the angled top portion of the bag member, the compression straps for tightening the top portion of the bag member and compressing stored items therein; and an adjustable carrying strap, opposite ends of the carrying strap attached to the vertical front portion and the vertical rear portion of the bag member, the carrying strap used for carrying the bag member when not attached to the bicycle frame and car top carrier.

11. The storage bag as described in claim 10 further including a mesh weave storage pocket attached to the vertical front portion of the bag member, the storage pocket adapted for holding at least one water bottle therein.

* * * * *